US009588562B2

(12) United States Patent
Guichard et al.

(10) Patent No.: US 9,588,562 B2
(45) Date of Patent: Mar. 7, 2017

(54) METHOD FOR WAKING UP A DISTANT DEVICE FROM A LOCAL DEVICE WITHOUT WAKING UP A PHYSICAL LAYER UNIT IN THE DISTANT DEVICE

(71) Applicant: SERCEL, Carquefou (FR)

(72) Inventors: Florent Guichard, Nantes (FR); Christian Gregoire, La Chapelle sur Erdre (FR); Jacques Thebaud, Coueron (FR)

(73) Assignee: SERCEL, Carquefou (FR)

( * ) Notice: Subject to any disclaimer, the term of this patent is extended or adjusted under 35 U.S.C. 154(b) by 103 days.

(21) Appl. No.: 14/599,770

(22) Filed: Jan. 19, 2015

(65) Prior Publication Data

US 2015/0212562 A1 Jul. 30, 2015

(30) Foreign Application Priority Data

Jan. 29, 2014 (EP) ..................................... 14305116

(51) Int. Cl.
*G06F 1/00* (2006.01)
*G06F 1/32* (2006.01)
(Continued)

(52) U.S. Cl.
CPC ............... *G06F 1/266* (2013.01); *H04L 12/12* (2013.01); *H04W 52/0229* (2013.01)

(58) Field of Classification Search
CPC ..................................................... G06F 1/3203
(Continued)

(56) References Cited

U.S. PATENT DOCUMENTS 7,392,409 B2 * 6/2008 Tateyama ............ G06F 13/4291
358/1.14
7,574,615 B2 * 8/2009 Weng .................... G06F 1/3203
713/320

(Continued)

FOREIGN PATENT DOCUMENTS

WO 2005109842 A2 11/2005

OTHER PUBLICATIONS

European Search Report and Written Opinion dated Jun. 24, 2014 for corresponding European Patent Application No. 14305116, filed Jan. 29, 2014.

(Continued)

*Primary Examiner* — Suresh Suryawanshi
(74) *Attorney, Agent, or Firm* — David D. Brush; Westman Champlin & Koehler, P.A.

(57) ABSTRACT

A method for waking up a distant device from a local device, through a transmission medium and distant and local media converters. Initially, at least one of the physical and link layer units of the distant device is off, and its processing layer unit is off or in Low Power mode. The transceiver of the distant media converter is on. When receiving an initial wake-up signal from the local device, the transceiver of the distant media converter generates an electrical wake-up signal converted from the initial wake-up signal. The transceiver of the distant media converter sends the electrical wake-up signal, or derived wake-up information, to the processing layer unit of the distant device, through a transmission line independent of the physical and link layer units of the distant device. When receiving the electrical wake-up signal or the wake-up information, the processing layer unit of the distant device turns on.

19 Claims, 8 Drawing Sheets

(51) Int. Cl.
　　　*G06F 1/26* (2006.01)
　　　*H04L 12/12* (2006.01)
　　　*H04W 52/02* (2009.01)
(58) Field of Classification Search
　　　USPC .......................................................... 713/310
　　　See application file for complete search history.

(56) References Cited

U.S. PATENT DOCUMENTS

| | | | | |
|---|---|---|---|---|
| 8,321,708 | B2* | 11/2012 | Dring | G06F 1/3203 |
| | | | | 713/320 |
| 8,799,633 | B2* | 8/2014 | Suganami | H04L 12/12 |
| | | | | 713/2 |
| 9,170,632 | B2* | 10/2015 | Brooks | G06F 1/3203 |
| 2013/0329621 | A1 | 12/2013 | Kondo et al. | |
| 2015/0205339 | A1* | 7/2015 | Park | G06F 1/3278 |
| | | | | 713/323 |

OTHER PUBLICATIONS

Yuvraj Agarwal et al: "Somniloquy: Maintaining Network Connectivity While Your Computer Sleeps", Microsoft MSR-TR-2008-42, Mar. 31, 2008, XP008131463.
Shin, Bahl, Sinclair: "Wake on Wireless: An Event Driven Energy Saving Strategy for Battery Operated Devices", ACM, 2 Penn Plaza, Suite 701—New York USA, Sep. 30, 2002, XP040139027.

* cited by examiner

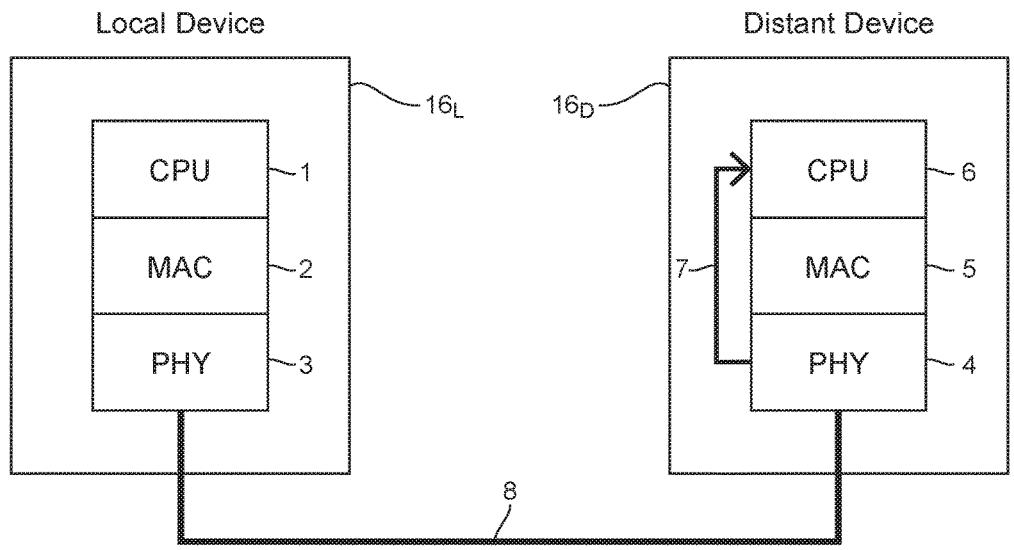
Fig. 1(PriorArt)
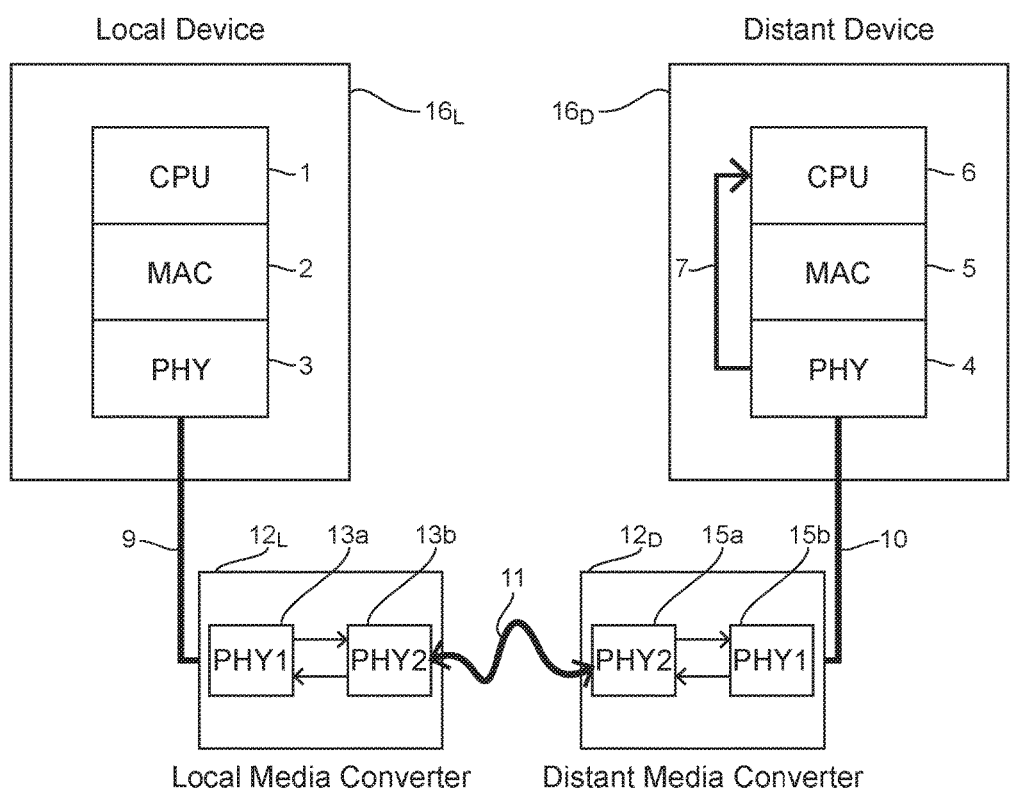
Fig. 2 (PriorArt)

METHOD FOR WAKING UP A DISTANT DEVICE FROM A LOCAL DEVICE WITHOUT WAKING UP A PHYSICAL LAYER UNIT IN THE DISTANT DEVICE

1. CROSS-REFERENCE TO RELATED APPLICATIONS

This Application claims priority to and benefits of European Application EP14305116.7, Filed Jan. 29, 2014, the entire content of which is incorporated herein by reference in its entirety.

2. FIELD OF THE DISCLOSURE

The field of the disclosure is that of computer networking technologies, allowing to interconnect devices (also referred to as "computers", "computing devices", "equipment", etc.).

More specifically, the disclosure pertains to a technique for waking up a device through a media converter.

3. TECHNOLOGICAL BACKGROUND

FIG. 1 shows a standard architecture of first known systems comprising two devices (hereafter called "local device" 16L and "distant device" 16D), connected together by a wired link 8 (e.g. an Ethernet link implemented as a copper cable). Each device comprises a physical layer unit (also referred to as "PHY", and referenced 3 or 4), a link layer unit (also referred to as "MAC", and referenced 2 or 5) and a processing layer unit (also referred to as "CPU", and referenced 1 or 6). In this context, we consider the following problem: the local device 16L has to wake up the distant device 16D.

In such a context, the "Wake-On-Lan" method is currently used to wake up a distant device. The local CPU 1 transmits a magic packet on the copper cable 8, through the local MAC 2 and the local PHY 3, to the distant device 16D. This magic packet is detected by the distant PHY 4, which generates an interrupt 7 to wake up the distant CPU 6. Then the distant CPU 6 configures the distant MAC 5 to establish a link between the local CPU 1 and the distant CPU 6.

With this "Wake-On-Lan" method, a lower consumption is obtained since the CPU 6 and the MAC 5 of the distant device 16D are in "Low Power mode" and off respectively. But the PHYs 3,4 of the two devices are still powered on, and the communication between the two PHYs is always active.

As shown in FIG. 2, in second known systems, the wired link 8 between the two devices 16L, 16D is replaced by two media converters, which communicate via a transmission medium 11 (optical fiber, air, etc.). More precisely, a local media converter 12L is connected to the local device 16L via a first cable 9, and a distant media converter 12D is connected to the distant device 16D via a second cable 10.

In a basic implementation of these second known systems, the two media converters 12L, 12D are always active to be able to exchange packets:

- the local media converter 12L is active, since the interface towards local device 16L (managed by PHY 13a) is active, and the transmission on medium 11 (managed by PHY 13b and using a media transceiver (not shown)) is active to maintain link between the two media converters;
- the distant media converter 12D is active since the interface towards distant device 16D (managed by PHY 15b) is active, and the transmission on medium 11 (managed by PHY 15a and using a media transceiver (not shown)) is active to maintain link between the two media converters.

In other words, in this basic implementation of the second known systems, the PHYs 13a,13b,15a,15b of the two media converters 12L, 12D are always active. So the power consumption of these second known systems may be high even if the aforesaid "Wake-On-Lan" method is implemented (i.e. with a lower consumption obtained with the CPU 6 and the MAC 5 of the distant device 16D in "Low Power mode" and off respectively).

In order to further reduce the power consumption, industry has developed "EEE modes" ("Energy-Efficient Ethernet modes") in the Ethernet PHY, so that PHY power consumption for the local device 16L and the distant device 16D is reduced when the CPU 6 and MAC 5 of the distant device 16D and the CPU 1 and MAC 2 of the local device 16L are in the "Low Power mode". This reduction is achieved by not transmitting packets between the two devices 16L,16D in these "EEE modes". Compared to the "Wake-On-Lan" method, the power consumption is reduced because the two PHYs 3,4 of the local and distant devices 16L, 16D are in the "Low Power mode". Nevertheless, the two PHYs 3,4 are still powered on (a signal is always transmitted between the two PHYs 3,4 in the "EEE modes"), i.e. are not off, and therefore consumes.

Moreover, the "EEE modes" are not available for the transmission medium 11 (optical fiber, air, etc.) of the second known systems. So, for the second known systems of FIG. 2, the power consumed by the distant media converter 12D and the local media converter 12L is not reduced very much because the PHYs 13b and 15a are fully active (only PHYs 13a and 15b are in "Low Power mode" thanks to "EEE modes").

4. SUMMARY

A particular embodiment of the disclosure proposes a method for waking up a distant device from a local device, through a transmission medium and a distant media converter and a local media converter associated with said distant device and said local device respectively, each of said local and distant devices comprising a physical layer unit, a link layer unit and a processing layer unit, each of said local and distant media converters comprising a transceiver. The method comprises the following steps:

- initially, at least one of the physical layer unit and the link layer unit of said distant device is off, the processing layer unit of said distant device is off or in Low Power mode, the transceiver of said distant media converter is on;
- when receiving an initial wake-up signal from said local device, via said transmission medium, the transceiver of said distant media converter generates an electrical wake-up signal resulting from the conversion of said initial wake-up signal;
- the distant media converter sends said electrical wake-up signal, or a wake-up information derived from said electrical wake-up signal, to the processing layer unit of said distant device, through a first transmission line which is independent of the physical layer unit and the link layer unit of said distant device;
- when receiving said electrical wake-up signal or said wake-up information, the processing layer unit of said distant device turns on.

This particular embodiment relies on a wholly novel and inventive approach taking advantage of the fact that at least one (and preferentially both) of the physical layer unit (PHY) and the link layer unit (MAC) of the distant device (to be woken up) is off, i.e. not in the "Low Power mode" (as is the case in the known "EEE modes"). Thus the power consumption of the distant device is reduced, compared with the known solutions.

The use of a first transmission line (see below various examples of implementation of this line transmission) which is independent of the physical layer unit (PHY) and the link layer unit (MAC) of the distant device, allows to obtain a time to "wake up" the processing layer unit (CPU) of the distant device as short as for the "Wake-On-Lan" method (i.e. no wake-up propagation time penalty).

According to a particular feature, the distant media converter comprises a physical layer unit which is initially off and may be the same as the physical layer unit of the distant device if the distant device and the distant media converter are integrated in a same housing.

Thus the power consumption of the distant media converter (associated with the distant device to be woken up) is also reduced, compared with the known solutions (in which at least a part of the physical layer unit (PHY) of the distant media converter is always active).

According to a first implementation, the distant device and the distant media converter being integrated in two separated housings connected by a cable. The method comprises the following steps:
   the processing layer unit of the distant device is initially in Low Power mode;
   the transceiver of said distant media converter sends the electrical wake-up signal to an electrical consumption unit comprised in the distant media converter;
   when receiving the electrical wake-up signal, the electrical consumption unit generates an electrical consumption variation of the distant media converter, said electrical consumption variation being representative of said wake-up information;
   a detection unit, comprised in the distant device, generates a wake-up information signal when detecting said electrical consumption variation via said cable;
   the detection unit sends said wake-up information signal to the processing layer unit of said distant device;
   when receiving said wake-up information signal, the processing layer unit of said distant device turns on.

In this first implementation, the transmission line comprises an electrical consumption unit and a detection unit. It does not require additional wire between the distant media converter and the distant device.

According to a second implementation, the distant device and the distant media converter being integrated in two separated housings connected by a cable. The method comprises the following steps:
   the processing layer unit of said distant device is initially in Low Power mode;
   the transceiver of said distant media converter sends the electrical wake-up signal to an electrical consumption unit comprised in the distant media converter;
   when receiving the electrical wake-up signal, the electrical consumption unit generates an electrical consumption variation of the distant media converter, said electrical consumption variation being representative of said wake-up information;
   the processing layer unit of said distant device obtains said wake-up information by detecting said electrical consumption variation via said cable;
   when obtaining said wake-up information, the processing layer unit of said distant device turns on.

In this second implementation, the transmission line comprises an electrical consumption unit (but no detection unit, the detecting function being carried out by the processing layer unit (CPU) of the distant device). It does not require additional wire between the distant media converter and the distant device.

According to a third implementation, the distant device and the distant media converter being integrated in two separated housings connected by a cable. The method comprises the following step:
   the processing layer unit of said distant device is initially in Low Power mode;
   the transceiver of said distant media converter sends the electrical wake-up signal to the processing layer unit of said distant device, through a direct link;
   when receiving said electrical wake-up signal, the processing layer unit of said distant device turns on.

In this third implementation, the transmission line comprises a direct link inside the cable between the distant media converter and the distant device.

According to a fourth implementation, the distant device and the distant media converter being integrated in two separated housings connected by a cable. The method comprises the following step:
   the processing layer unit of said distant device is initially off;
   the transceiver of said distant media converter sends the electrical wake-up signal to an electrical consumption unit comprised in the distant media converter;
   when receiving the electrical wake-up signal, the electrical consumption unit generates an electrical consumption variation of the distant media converter, said electrical consumption variation being representative of said wake-up information;
   when detecting said electrical consumption variation via said cable, a wake-up circuit, comprised in the distant device:
      generates a powering signal and sends it to a power supply unit comprised in the distant device, and
      generates a wake-up information signal and sends it to the processing layer unit of said distant device;
   when receiving said powering signal, the power supply unit of said distant device powers the processing layer unit of said distant device;
   when receiving said wake-up information signal, the processing layer unit of said distant device turns on.

In this fourth implementation, the transmission line comprises an electrical consumption unit and a wake-up circuit cooperating with a power supply unit. The wake-up circuit carries out the detecting function and an ultra-low power management since it allows the processing layer unit (CPU) of the distant device to be initially off (instead of "Low Power mode" in the first, second and third implementations). The transmission line does not require additional wire between the distant media converter and the distant device.

According to a fifth implementation, the distant device and the distant media converter being integrated in a same housing, characterized in that it comprises the following steps:
   the processing layer unit of said distant device is initially in Low Power mode;
   the transceiver of said distant media converter sends the electrical wake-up signal to the processing layer unit of said distant device, through a direct link which is inside said housing;
   when receiving said electrical wake-up signal, the processing layer unit of said distant device turns on.

In this fifth implementation, the transmission line comprises a direct link inside the housing integrating the distant media converter and the distant device.

According to a particular feature, the detecting of said electrical consumption variation via said cable comprises:
- a media converter power supply unit, comprised in the distant device, provides a power supply to the distant media converter via said cable;
- said electrical consumption variation is detected as a variation of a parameter of said power supply.

Thus, as indicated above, in the first, second and fourth implementations, the transmission line does not require additional wire between the distant media converter and the distant device.

According to a particular feature, said electrical consumption unit is no more powered after the distant device has been woke up.

Thus there is no overconsumption of the distant media converter (compared with the known solutions) after the distant device has been woken up.

According to a particular feature, initially, only a receiving part of the transceiver of said distant media converter is on, a transmitting part being off.

Thus the power consumption of the distant media converter in sleep mode is further reduced, compared with the known solutions.

According to a particular feature, said electrical wake-up signal has a waveform belonging to a group of at least two possible waveforms, each possible waveform being associated with a different supplemental information.

Thus it is possible to exchange information between a local device and a distant device (in sleep mode and to be woken up), without establishing PHY links (i.e. without link between their physical layer units).

According to a particular feature, each possible waveform is associated with a different wake-up mode.

Thus it is possible to choose among several wake-up modes (e.g. test wake-up mode, normal wake-up mode, or other wake-up modes).

In a first application (complete awakening of the distant device), the step in which the processing layer unit of said distant device turns on, is followed by a step in which the processing layer unit of said distant device turns on the physical layer unit and the link layer unit of said distant device.

Thus, the processing layer unit of the distant device can send a wake-up command response to the local device, through the link layer unit and the physical layer unit of the distant device which have been turned on.

In a second application (partial awakening of the distant device), the step in which the processing layer unit of said distant device turns on, is followed by the following steps:
- the processing layer unit of said distant device sends an acknowledgement request to the transceiver of said distant media converter, through a second transmission line which is independent of the physical layer unit and the link layer unit of said distant device;
- when receiving said acknowledgement request, the transceiver of said distant media converter sends to the transceiver of said local media converter, via said transmission medium, an initial acknowledgement signal.

Thus, the processing layer unit of the distant device can send an acknowledgement to the local device, even though the link layer unit and the physical layer unit (of the distant device) have not been turned on (at least one of them is off).

According to a particular feature of the second application, the method comprises the following steps:
- when receiving said initial acknowledgement signal from said distant device, via said transmission medium, the transceiver of said local media converter generates an electrical acknowledgement signal resulting from the conversion of said initial acknowledgement signal;
- the local media converter sends said electrical acknowledgement signal, or an acknowledgement information derived from said electrical acknowledgement signal, to the processing layer unit of said local device, through a third transmission line which is independent of the physical layer unit and the link layer unit of said local device, at least one of the physical layer unit and the link layer unit of said local device being off or in Low Power mode.

Thus, the processing layer unit of the local device can receive the aforesaid acknowledgement (coming from the local device), even though the link layer unit and the physical layer unit of the local device have not been turned on (at least one of them is off). In other words, the local device is only partially awakened.

According to a particular feature, the method comprises the following steps:
- initially, at least one of the physical layer unit and the link layer unit of said local device is off or in Low Power mode, the transceiver of said local media converter is on;
- the processing layer unit of said local device sends a wake-up request to the transceiver of said local media converter, through a fourth transmission line which is independent of the physical layer unit and the link layer unit of said local device;
- when receiving said wake-up request, the transceiver of said local media converter sends to the transceiver of said distant media converter, via said transmission medium, said initial wake-up signal.

Thus the power consumption of the local device is also reduced.

Another particular embodiment of the disclosure proposes a method for waking up a plurality of devices connected in series, the aforesaid method for waking up a distant device from a local device is implemented in a cascade process: for a pair of successive devices acting respectively as a local device and a remote device, after the remote device has been awakened, its processing layer unit being turned on, it acts as a local device and sends an initial wake-up signal to the next device, acting as a remote device.

Thus it is very easy to wake up a plurality of devices, with a power consumption which is reduced for the plurality of devices, compared with the known solutions.

Another particular embodiment of the disclosure proposes an assembly comprising a distant device and a distant media converter, integrated in the same housing or in two separated housings connected by a cable, said distant device comprising a physical layer unit, a link layer unit and a processing layer unit, said distant media converter comprising a transceiver, characterized in that:
- the transceiver comprises means for generating an electrical wake-up signal resulting from the conversion of an initial wake-up signal received from a local device via a transmission medium;
- the distant media converter comprises means for sending said electrical wake-up signal, or a wake-up information derived from said electrical wake-up signal, to the processing layer unit, through a first transmission line which is independent of the physical layer unit and the link layer unit;

the processing layer unit comprises means, activated when receiving said electrical wake-up signal or said wake-up information, for turning on, at least one of the physical layer unit and the link layer unit being initially off, the processing layer unit being initially off or in Low Power mode.

Another particular embodiment of the disclosure proposes an assembly comprising a local device and a local media converter, integrated in the same housing or in two separated housings connected by a cable, said local device comprising a physical layer unit, a link layer unit and a processing layer unit, said local media converter comprising a transceiver:

the processing layer unit comprises means for sending a wake-up request to the transceiver of said local media converter, through a transmission line which is independent of the physical layer unit and the link layer unit, at least one of the physical layer unit and the link layer unit being initially off or in Low Power mode;

the transceiver comprises means, activated when receiving said wake-up request, for sending to a transceiver of a distant media converter, via a transmission medium, an initial wake-up signal.

Advantageously, these assemblies comprise means for implementing the steps of the method as described above, in any of its various embodiments.

5. LIST OF FIGURES

Other features and advantages of embodiments shall appear from the following description, given by way of an indicative and non-exhaustive examples and from the appended drawings, of which:

FIG. 1, already described with reference to the prior art, presents a standard architecture of first known systems comprising a local device and a distant device connected together by a wired link;

FIG. 2, already described with reference to the prior art, presents a standard architecture of second known systems comprising a local device and a distant device connected together by two media converters communicating via a transmission medium;

6. DETAILED DESCRIPTION

In all of the figures of the present document, identical elements and steps are designated by the same numerical reference sign.

Figure 3:
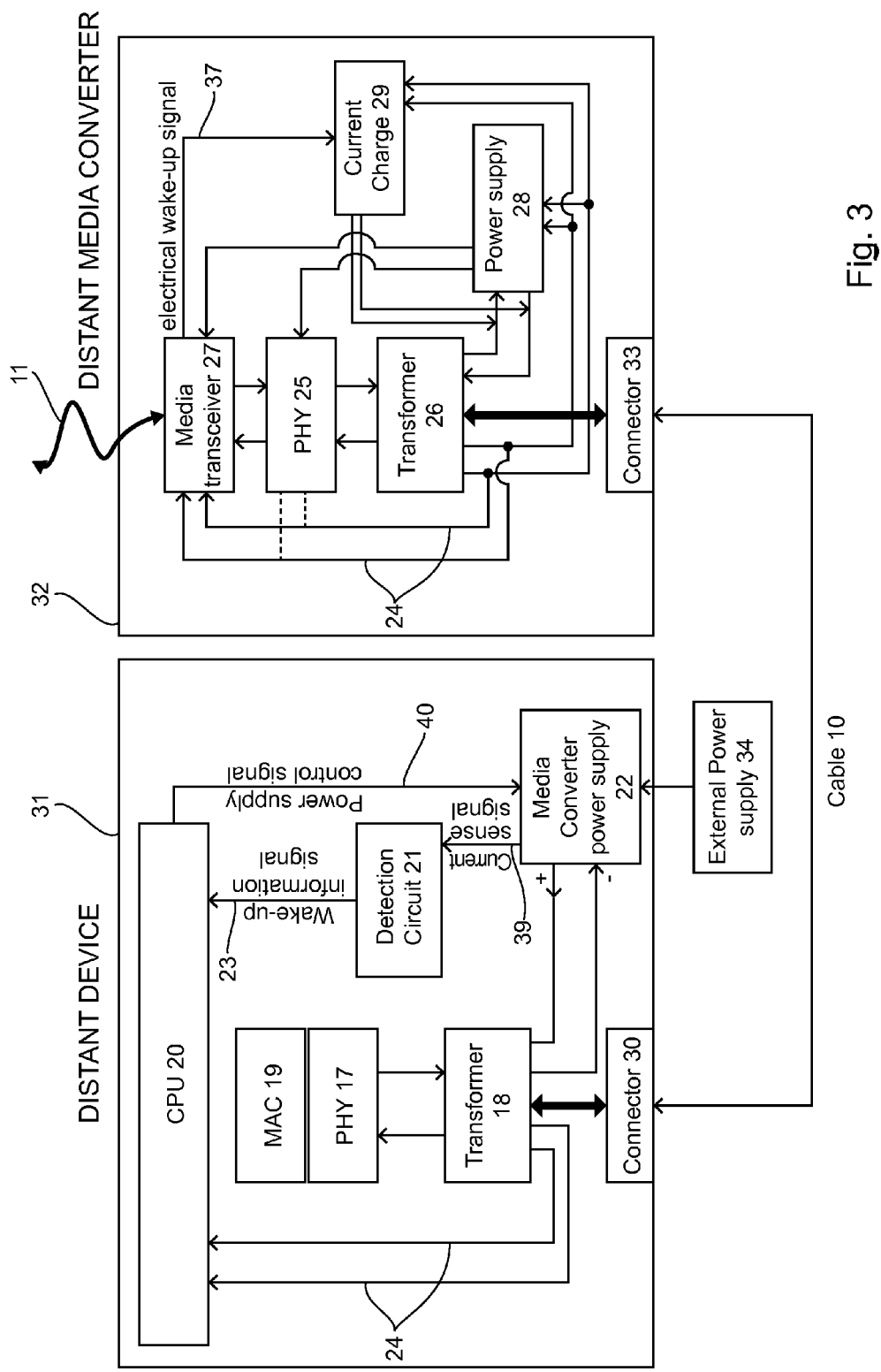
FIG. 3 is a schematic illustration of a distant device and a distant media converter according to a first implementation of the disclosure.

FIG. 3 is a schematic illustration of a distant device 31 and a distant media converter 32 according to a first implementation of the disclosure.

We assume the distant device 31 is in sleep mode and has to be woken up by a local device (not shown) associated with a local media converter (not shown).

We also assume there is a transmission medium 11 (optical fiber, air, etc.) between the local media converter and the distant media converter.

The distant device 31 and the distant media converter 32 are integrated in two separate housings and are connected through a cable 10.

The distant device 31 comprises:
a processing layer unit CPU 20;
a link layer unit MAC 19 (e.g. an Ethernet MAC);
a physical layer unit PHY 17 (e.g. a 1000Base-T PHY) and its transformer 18;
a connector 30 through which the physical layer unit PHY 17 and its transformer 18 are connected to the cable 10;
a detection unit 21;
a media converter power supply unit 22, which receives power from an external power supply unit 34 and provides power to the distant media converter 32. The media converter power supply unit 22 is controlled by the processing layer unit CPU 20, via a power supply control signal 40.

The cable 10 is for example made up of four pairs for 1000Base-T signals in differential mode. For example, on the cable 10, power is supplied in common mode over two pairs, I2C DATA signal is transmitted in common mode over one pair, and I2C CLOCK signal is transmitted in common mode over one pair.

The distant media converter 32 comprises:
a media transceiver 27;
a physical layer unit PHY 25 (e.g. a 1000Base-T PHY) and its transformer 26. More precisely, the physical layer unit PHY 25 comprises two physical layer unit PHY corresponding to the PHYs 15a and 15b of the distant media converter 12D of FIG. 2;
a connector 33 through which the physical layer unit PHY 25 and its transformer 26 are connected to the cable 10;
an electrical consumption unit 29 (also referred to as "current charge" in the shown example). It may be made up by only one resistor and one transistor (e.g. a MOSFET), so the function is easy to integrate;
a power supply unit 28, which receives power (power supply) from the media converter power supply unit 22 (comprised in the distant device 31) through the cable 10 (and the transformers 18, 26 and the connectors 30, 33), and provides power to the physical layer unit PHY 25 and the transceiver 27.

The distant device 31 can send media converter control signals 24 to the transceiver 27 and the physical layer unit PHY 25, via the transformer 18, the connector 30, the cable 10, the connector 33 and the transformer 26. The media converter control signals 24 are for example compliant with the standard I2C or any communication interface standard compatible with PHY and transceiver components.

Figure 8:
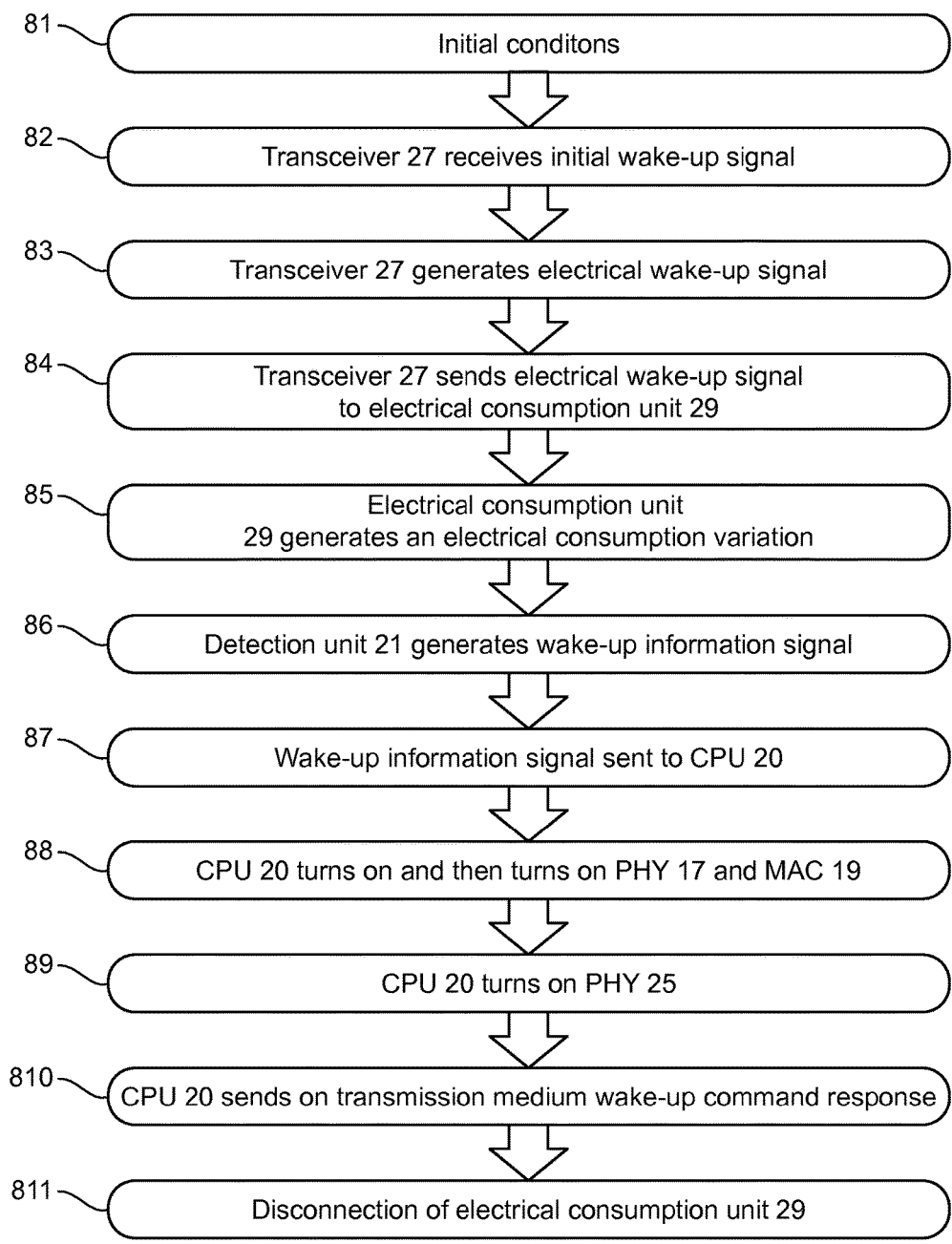
FIG. 8 is a flowchart detailing the operation of the distant device and the distant media converter in the first implementation illustrated in FIG. 3.

We detail now, with FIG. 8, the operation of the distant device 31 and the distant media converter 32 in the first implementation illustrated in FIG. 3.

Initially (in step 81), when the distant device 31 and the distant media converter 32 are in the sleep mode:
the physical layer unit PHY 17 and the link layer unit MAC 19 of the distant device 31 are off;
the processing layer unit CPU 20 of the distant device 31 is in Low Power mode;
the physical layer unit PHY 25 of the distant media converter 32 is off;
the transceiver 27 of the distant media converter 32 is configured so that transceiver transmission is off to save power (in other words, only a receiving part of the transceiver 27 is on, a transmitting part of the transceiver 27 being off).

Returning to FIG. 3, in step 82, the transceiver 27 receives an initial wake-up signal from the local device, via the transmission medium 11.

In step 83, the transceiver 27 generates an electrical wake-up signal 37 resulting from the conversion of the initial wake-up signal.

In step 84, the transceiver 27 sends the electrical wake-up signal 37 to the electrical consumption unit 29.

In step 85, when receiving the electrical wake-up signal, the electrical consumption unit 29 generates an electrical consumption variation of the media converter. This electrical consumption variation (e.g. be a voltage or a current consumption variation) is representative of a wake-up information.

In step 86, the detection unit 21, comprised in the distant device 31, generates a wake-up information signal 23 when detecting the electrical consumption variation. This detection is possible because the media converter power supply unit 22 provides power to the distant media converter 32 and also provides the detection unit 21 with a sense signal 39 relating to a parameter of the electrical consumption variation (e.g. a current sense signal in case the electrical consumption variation to be detected is a current consumption variation).

In step 87, the detection unit 21 sends the wake-up information signal 23 to the processing layer unit CPU 20.

In step 88, when receiving the wake-up information signal 23, the processing layer unit CPU 20 turns on, and then turns on the physical layer unit PHY 17 and the link layer unit MAC 19.

In step 89, the processing layer unit CPU 20 turns on the physical layer unit PHY 25 and the transmitting part of the transceiver 27, of the distant media converter 32, using the media converter control signals 24.

In step 810, the processing layer unit CPU 20 sends on the transmission medium 11 a wake-up command response (also referred to as "acknowledgement signal") to the local device, through a classical transmission line comprising the link layer unit MAC 19, the physical layer unit PHY 17, the transformer 18, the connector 30, the cable 10, the connector 33, the transformer 26, the physical layer unit PHY 25 and the transceiver 27.

In step 811 (which can be carried out before step 89 and 810), the electrical consumption unit 29 is disconnected by the processing layer unit CPU 20 (using the media converter control signals 24), to save power when the distant device 31 and the distant media converter 32 are ON. In other words, the electrical consumption unit 29 is no more powered after the distant device 31 and the distant media converter 32 have been woken up.

Thus, in this first implementation, the distant media converter 32 sends a wake-up information (derived from the electrical wake-up signal 37), to the processing layer unit CPU 20 of the distant device 31, through a transmission line which is independent of the physical layer unit PHY 17 and the link layer unit MAC 19. This transmission line comprises the electrical consumption unit 29, the power supply unit 28, the transformer 26, the connector 33, the cable 10, the connector 30, the transformer 18, the media converter power supply unit 22 and the detection unit 21. This transmission line does not require additional wire between the distant media converter 32 and the distant device 31.

Figure 4:
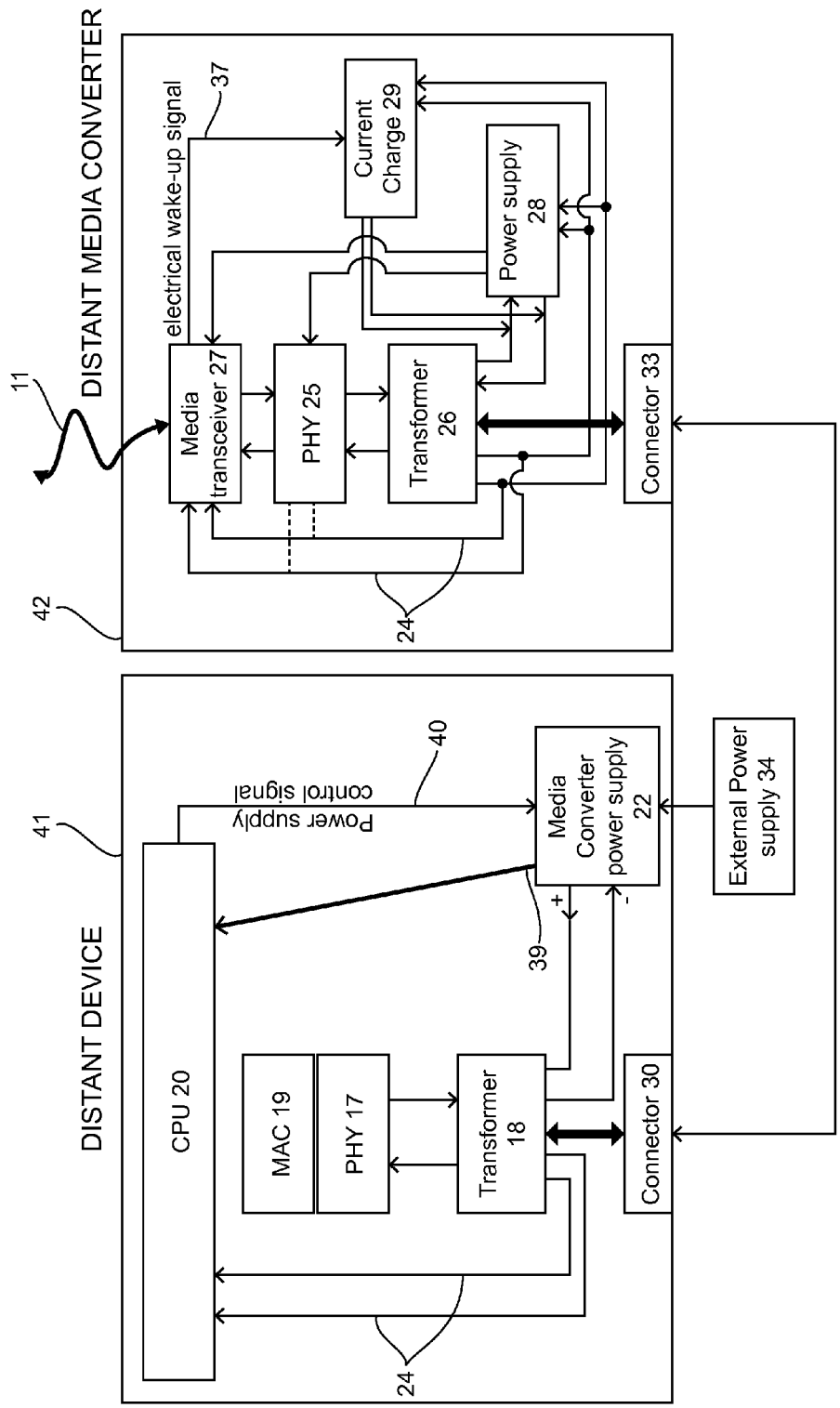
FIG. 4 is a schematic illustration of a distant device and a distant media converter according to a second implementation of the disclosure.

FIG. 4 is a schematic illustration of a distant device 41 and a distant media converter 42 according to a second implementation of the disclosure.

Differences with the first implementation of FIG. 3 are:
the current sense signal 39 is sent directly from the media converter power supply unit 22 to the processing layer unit CPU 20;
the processing layer unit CPU 20 carries out the function of detecting the electrical consumption variation;
there is no detection circuit 21, and therefore no wake-up information signal 23.

Thus, in this second implementation, the distant media converter 42 sends a wake-up information (derived from the electrical wake-up signal 37), to the processing layer unit CPU 20 of the distant device 41, through a transmission line which is independent of the physical layer unit PHY 17 and the link layer unit MAC 19. This transmission line comprises the electrical consumption unit 29, the power supply unit 28, the transformer 26, the connector 33, the cable 10, the connector 30, the transformer 18 and the media converter power supply unit 22. This transmission line does not require additional wire between the distant media converter 42 and the distant device 41.

Figure 5:
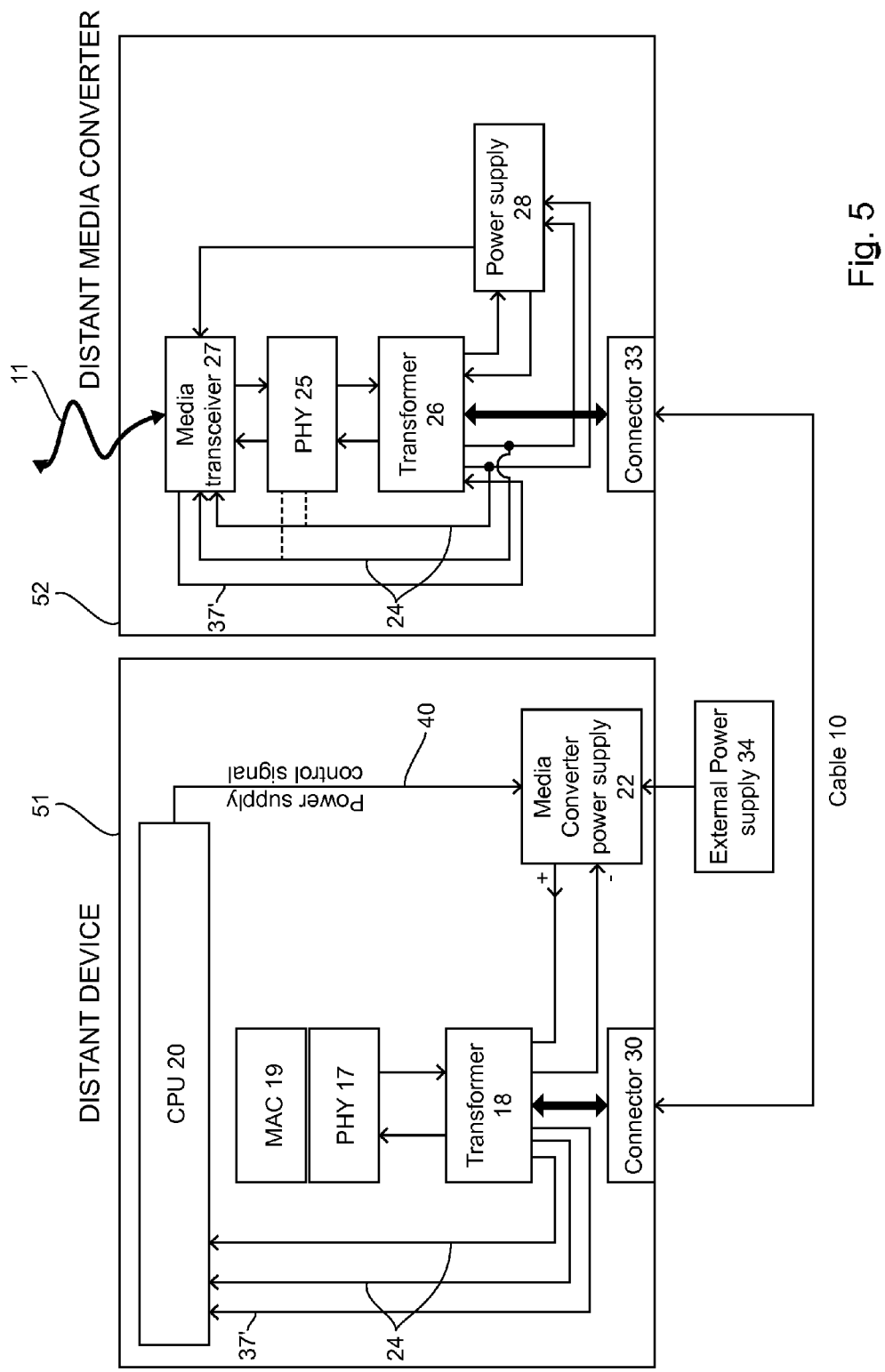
FIG. 5 is a schematic illustration of a distant device and a distant media converter according to a third implementation of the disclosure.

FIG. 5 is a schematic illustration of a distant device 51 and a distant media converter 52 according to a third implementation of the disclosure.

Differences with the first implementation of FIG. 3 are:
the electrical wake-up signal (noted here 37') is sent directly from the transceiver to the processing layer unit CPU 20, via a transmission line comprising the transformer 26, the connector 33, the cable 10, the connector 30 and the transformer 18;
the processing layer unit CPU 20 turns on when it receives the electrical wake-up signal 37';
there is no detection circuit 21, no current charge 29, and therefore no wake-up information signal 23.

Thus, in this third implementation, the distant media converter 52 sends a wake-up information (identical in the present case to the electrical wake-up signal 37'), to the processing layer unit CPU 20 of the distant device 41, through a transmission line which is independent of the physical layer unit PHY 17 and the link layer unit MAC 19.

Figure 6:
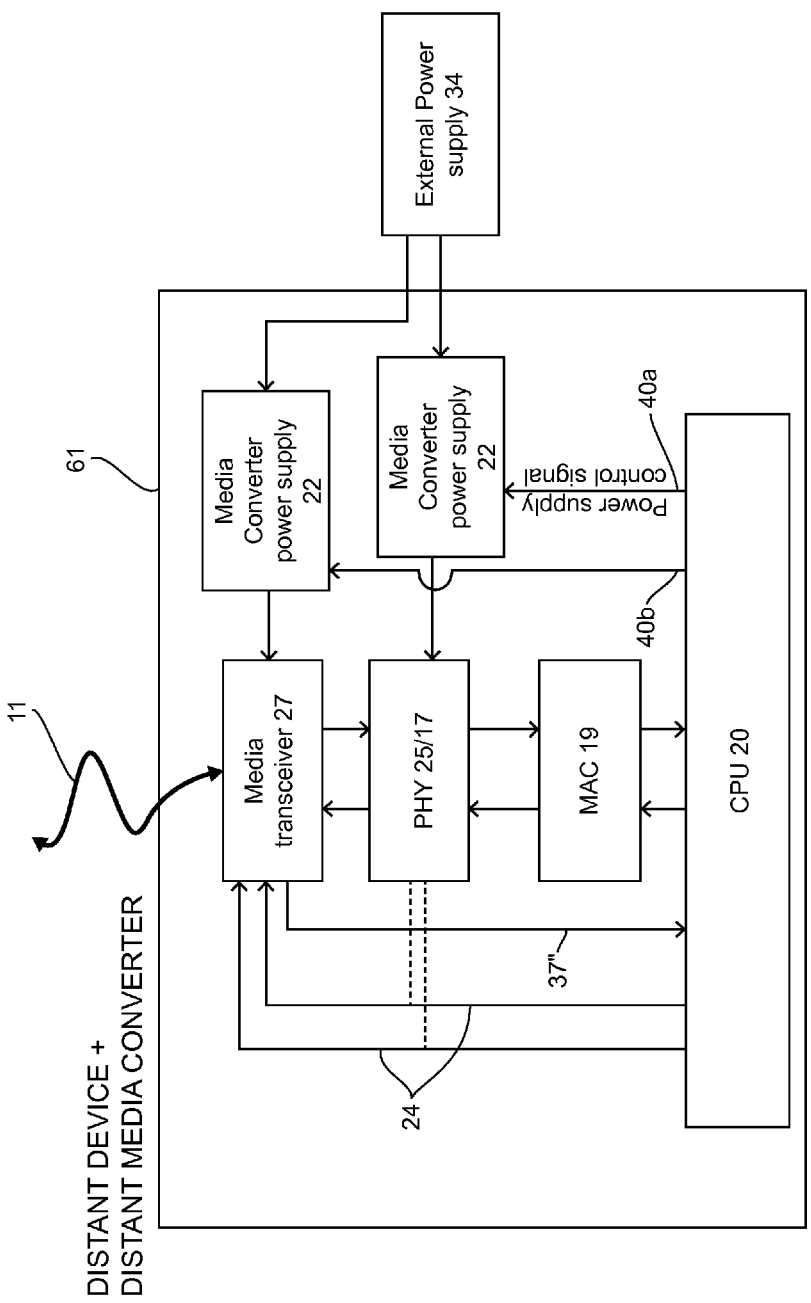
FIG. 6 is a schematic illustration of housing integrating a distant device and a distant media converter according to a fourth implementation of the disclosure.

FIG. 6 is a schematic illustration of a housing 61 integrating a distant device and a distant media converter according to a fourth implementation of the disclosure.

Differences with the first implementation of FIG. 3 are:
the electrical wake-up signal (noted here 37") is sent directly from the transceiver to the processing layer unit CPU 20, via a transmission line comprising a wire (direct link) inside the housing;
the processing layer unit CPU 20 turns on when it receives the electrical wake-up signal 37";
there is only one physical layer unit (noted PHY 25/17);
besides the media converter power supply unit (noted 22a) which powers the physical layer unit PHY 25/17, there is a media transceiver power supply unit (noted 22b) which powers the media transceiver 27. There are two power supply control signals: one (noted 40a) for controlling the media converter power supply unit 22a and the other (noted 40b) for controlling the transceiver converter power supply unit 22b;

there are neither connectors 30, 33 nor transformers 18, 26;

there is no detection circuit 21, no current charge 29, and therefore no wake-up information signal 23.

Thus, in this fourth implementation, the media converter (and more precisely the transceiver 27) sends a wake-up information (identical in the present case to the electrical wake-up signal 37"), to the processing layer unit CPU 20 of the distant device 41, through a transmission line which is independent of the physical layer unit PHY 25/17 and the link layer unit MAC 19.

Figure 7:
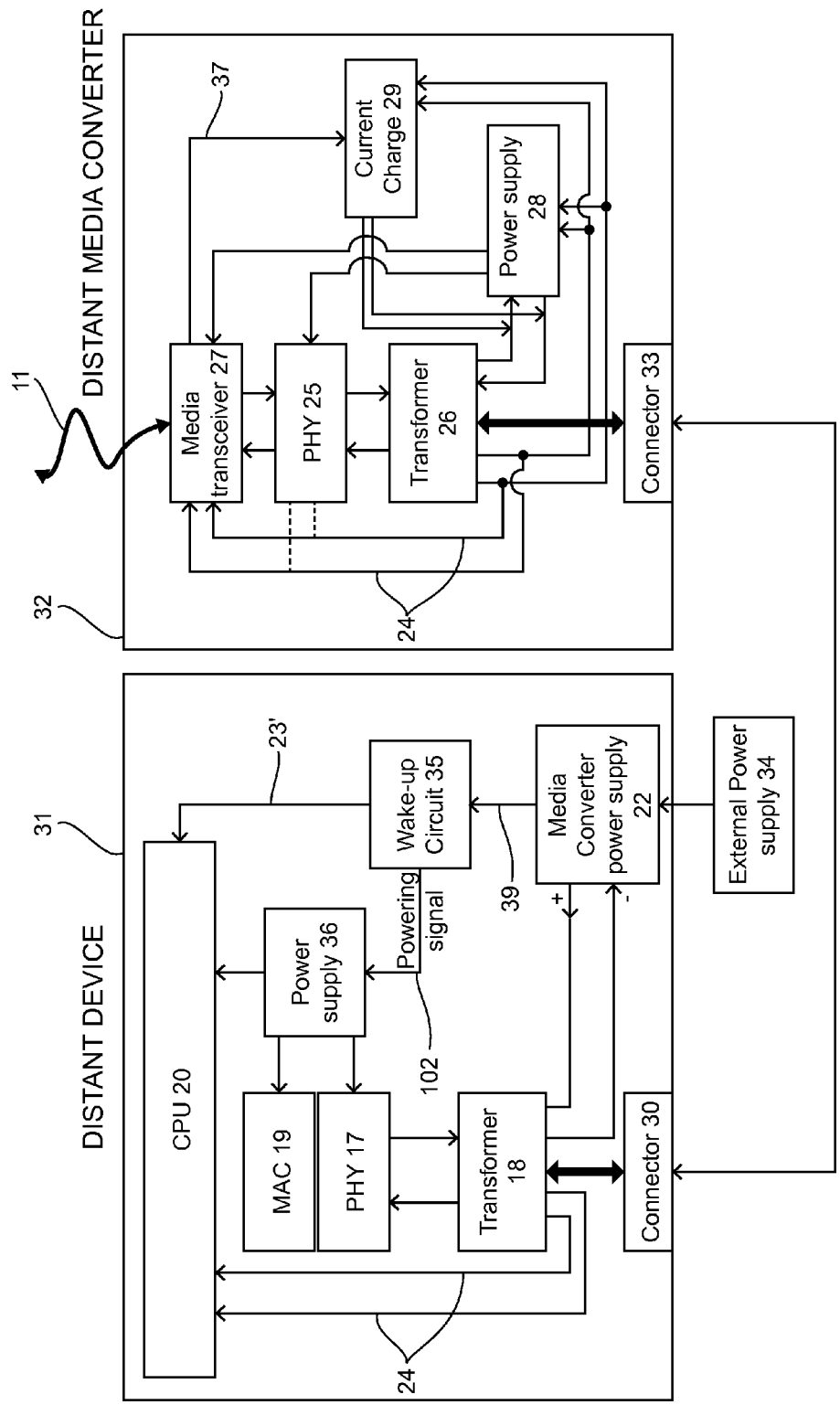
FIG. 7 is a schematic illustration of a distant device and a distant media converter according to a fifth implementation of the disclosure.

FIG. 7 is a schematic illustration of a distant device 71 and a distant media converter 72 according to a fifth implementation of the disclosure.

Differences with the first implementation of FIG. 3 are:

initially (i.e. when the distant device 71 and the distant media converter 72 are in the sleep mode), the processing layer unit CPU 20 of the distant device 71 is "off";

the detection circuit 21 is replaced by a wake-up circuit 35 and a power supply unit 36;

when detecting the electrical consumption variation, the wake-up circuit 35 sends a powering signal 102 to the power supply unit 36, in order to power the processing layer unit CPU 20, the physical layer unit PHY 17 and the link layer unit MAC 19;

when detecting the electrical consumption variation, the wake-up circuit 35 also sends the wake-up information signal (noted here 23') to the processing layer unit CPU 20, in order to enable it to wake up once it is powered by the power supply unit 36.

Thus, in this fifth implementation, the distant media converter 72 sends a wake-up information (derived from the electrical wake-up signal 37), to the processing layer unit CPU 20 of the distant device 71, through a transmission line which is independent of the physical layer unit PHY 17 and the link layer unit MAC 19. This transmission line comprises the electrical consumption unit 29, the power supply unit 28, the transformer 26, the connector 33, the cable 10, the connector 30, the transformer 18, the media converter power supply unit 22 and the wake-up circuit 35. This transmission line does not require additional wire between the distant media converter 72 and the distant device 71.

This fifth implementation is an ultra-low power management implementation since the processing layer unit CPU 20, the physical layer unit PHY 17 and the link layer unit MAC 19 are "Off" when the distant device 71 is in sleep mode. The wake-up circuit 35 is active ("On"). The media converter power supply unit 22 is also "On" and provides the power supply to the distant media converter 72 and sense the current consumption. This implementation can be used for example if the processing layer unit CPU 20 does not integrate low power management in sleep mode, or if its consumption is too high. The wake-up circuit 35 can be done with programmable logic (CPLD) or ultra-low power microcontroller.

Although the present disclosure has been described with reference to one or more examples, workers skilled in the art will recognize that changes may be made in form and detail without departing from the scope of the disclosure and/or the appended claims.

In an alternative embodiment, the electrical wake-up signal 37, 37', 37" can have different waveforms, each possible waveform being associated with a different supplemental information. Thus, it is possible to exchange supplemental information, between the local device and the distant device (very low level communication). For example, each possible waveform is associated with a different wake-up mode (test wake-up mode, normal wake-up mode, or other wake-up modes). For example, each waveform (i.e. each signal transmitted by the local device) may be differentiated by a modulation of its pulse duration and/or by a combination of several pulses (e.g. three short pulses could mean a particular command comprehensible to the processing layer unit 20 of the distant device).

In another alternative embodiment, a basic implementation consists in defining the information "Wake-up signal=1" as a condition to wake up the distant device. If "Wake-up signal=0", the distant device remains in Low Power.

However, this basic implementation, does not allow differentiating the normal case ("Wake-up signal not sent by the distant media converter") from the failure case ("cut of the transmission medium between the local and distant media converters".

An alternative implementation, in order to differentiate these cases, consists in defining for example "Wake-Up signal=1" during 1 ms each second, when the transmission medium is OK, and "Wake-Up signal=0" consistently when the transmission medium is KO, and "Wake-Up signal=1" consistently to wake up the distant device.

Figure 9:
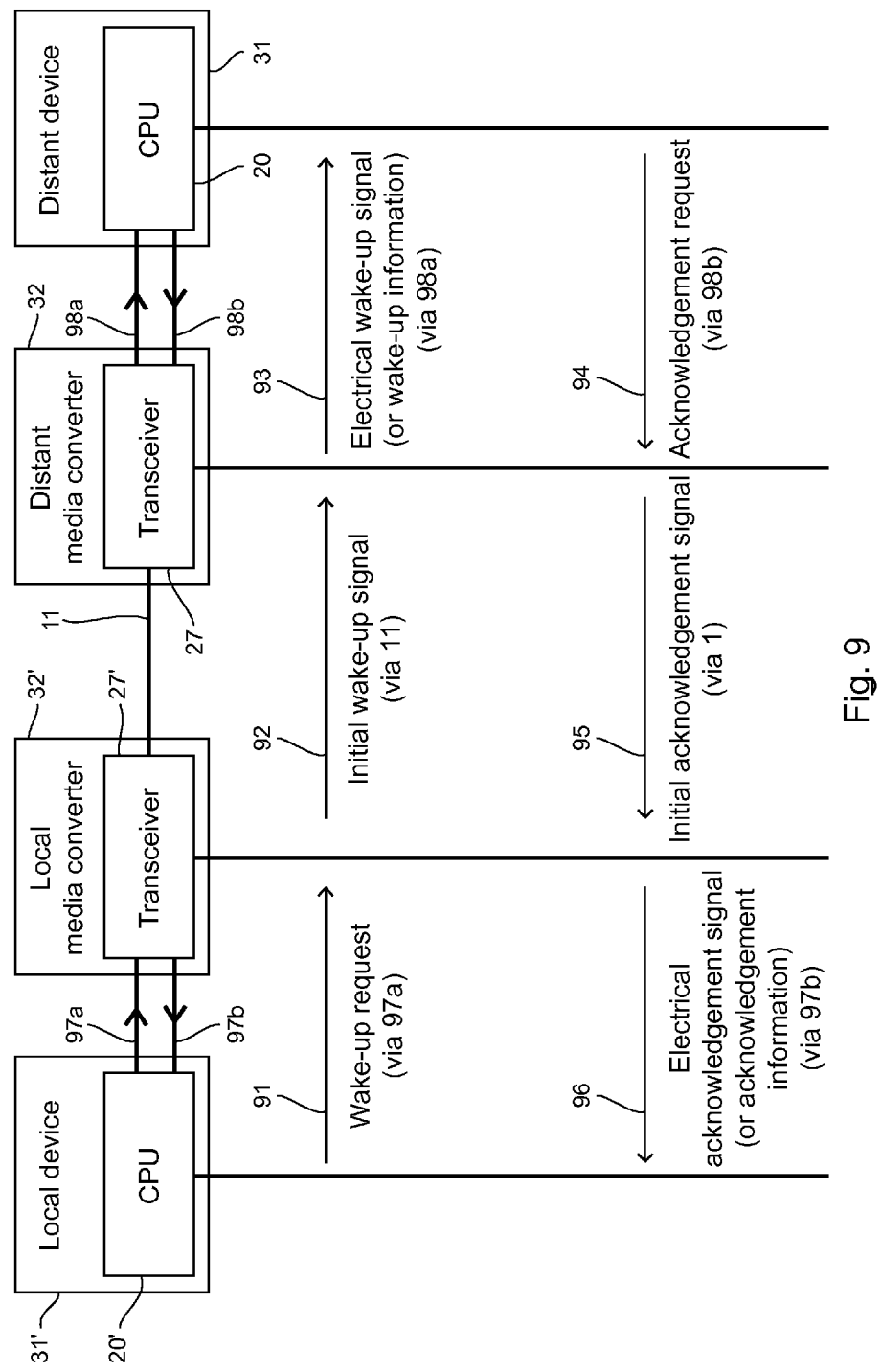
FIG. 9 is a schematic illustration of a particular application of the disclosure, with an exchange of wake-up and acknowledgement signals, between the local and distant devices, with only a partial awakening of these devices.

FIG. 9 is a schematic illustration of a particular application of the invention, with an exchange of wake-up and acknowledgement signals between the local device 31' and the distant device 31, with only a partial awakening of these devices.

We assume below that the local device 31' and the local media converter 32' have the same structure as the distant device 31 and the distant media converter 32 of FIG. 3, except the local device does not comprise the detection unit 21 and the local media converter does not comprise the electrical consumption unit 29.

The local device 31' can exchange media converter control signals (corresponding to those referenced 24 in FIG. 3) with the transceiver 27' and the physical layer unit PHY of the local media converter 32', via a transmission line 97a comprising: the transformer and the connector of the local device 31', the cable, and the connector and the transformer of the local media converter 32'.

The distant device 31 can exchange media converter control signals (referenced 24 in FIG. 3) with the transceiver 27 and the physical layer unit PHY of the distant media converter 32, via a transmission line 98b comprising: the transformer 18 and the connector 30 of the distant device 31, the cable 10, and the connector 33 and the transformer 26 of the distant media converter 32.

The transceiver 27 of the distant media converter 32 generates an electrical wake-up signal 37 and sends it (or a wake-up information derived from it) to the processing layer unit CPU 20 of the distant device 31, through a transmission line 98a which is independent of the physical layer unit PHY 17 and the link layer unit MAC 19 of the distant device 31. This transmission line 98a comprises the electrical consumption unit 29, the power supply unit 28, the transformer 26 and the connector 33 of the distant media converter 32, the cable 10, and the connector 30, the transformer 18, the media converter power supply unit 22 and the detection unit 21 of the distant device 31. This transmission line 98a does not require additional wire between the distant media converter 32 and the distant device 31.

The transceiver 27' of the local media converter 32' generates an electrical acknowledgement signal and sends it (or an acknowledgement information derived from it) to the processing layer unit of the local device 31', through a transmission line 97b which is independent of the physical layer unit and the link layer unit of the local device 31'. This transmission line 97b comprises the electrical consumption unit, the power supply unit, the transformer and the connector of the local media converter 32', the cable, and the connector, the transformer, the media converter power supply unit and the detection unit of the local device 31'. This transmission line 97b does not require additional wire between the local media converter 32' and the local device 31'.

We detail now the operation of this particular application:

initially, the physical layer unit and the link layer unit of the local device 31' are off or in Low Power mode, and the transceiver 27' of the local media converter 32' is on;

the processing layer unit 20' of the local device 31' sends (91) a wake-up request to the transceiver 27' of the local media converter 32', through the transmission line 97a (also used for sending media converter control signals and which is independent of the physical layer unit and the link layer unit of the local device 31');

when receiving this wake-up request, the transceiver 27' of the local media converter 32' sends (92) to the transceiver 27 of the distant media converter 32, via the transmission medium 11, the initial wake-up signal (see discussion of FIG. 3);

the transceiver 27 of the distant media converter 32 generates an electrical wake-up signal 37 and sends it (or a wake-up information derived from it) to the processing layer unit 20 of the distant device 31, through the transmission line 98a;

once the processing layer unit 20 of the distant device 31 is turned on (see description of FIGS. 3 and 8), it sends (94) an acknowledgement request to the transceiver 27 of the distant media converter 32, through the transmission line 98b;

when receiving this acknowledgement request, the transceiver 27 of the distant media converter 32 sends (95) to the transceiver 27' of the local media converter 32', via the transmission medium 11, an initial acknowledgement signal;

when receiving this initial acknowledgement signal, the transceiver 27' of the local media converter 32' generates an electrical acknowledgement signal (resulting from the conversion of the initial acknowledgement signal) and sends (96) it (or an acknowledgement information derived from it), to the processing layer unit 20' of the local device 31', through the transmission line 97b.

This exchange of wake-up and acknowledgement signals, between the local device 31' and the distant device 31, allows to check the transmission medium 11 (i.e. control its correct functioning) with only a partial awakening of these devices 31, 31'.

In alternative embodiments of the application discussed above with FIG. 9, the distant device and the distant media converter are implemented according to one of the implementations of FIGS. 4 to 7 (instead of the first implementation of FIG. 3). The local device and the local media converter have the same structure as the distant device and the distant media converter.

In another alternative embodiment, the physical layer unit and the link layer unit of the local device 31' are initially "on" and the processing layer unit 20' of the local device 31' sends a wake-up request to the transceiver of the local media converter, through a classical transmission line comprising the link layer unit, the physical layer unit, the transformer and the connector of the local device 31', the cable, and the connector, the transformer and the physical layer unit of the local media converter 32'.

In another embodiment, a method for waking up a plurality of devices connected in series is based on the above method for waking up a distant device from a local device. More precisely, the method for waking up a distant device from a local device is implemented in a cascade process: for a pair of successive devices acting respectively as a local device and a remote device, after the remote device has been awakened, its processing layer unit being turned on, it acts as a local device and sends an initial wake-up signal to the next device, acting as a remote device.

An exemplary embodiment of the disclosure provides a technique for waking up a distant device through a distant media converter, this technique allowing reducing the power consumption in sleep mode of the distant device and the distant media converter, compared to above known solutions.

An exemplary embodiment of the disclosure provides a technique of this kind with a time to "wake up" distant CPU as short as for the "Wake-On-Lan" method (i.e. no wake-up propagation time penalty).

An exemplary embodiment of the disclosure provides a technique of this kind that can be implemented with no additional wire between the distant media converter and the distant device.

An exemplary embodiment of the disclosure provides a technique of this kind, allowing to exchange information between local device and distant device in sleep mode, without establishing PHY links.

The invention claimed is:

1. A method for waking up a distant device from a local device, through a transmission medium and a distant media converter and a local media converter associated with said distant device and said local device respectively, each of said local and distant devices comprising a physical layer unit, a link layer unit and a processing layer unit, each of said local and distant media converters comprising a transceiver, said distant media converter comprising a physical layer unit, wherein said method comprises:

initially, at least one of the physical layer unit and the link layer unit of said distant device is off, the processing layer unit of said distant device is off or in Low Power mode, the transceiver of said distant media converter is on, and the physical layer unit of said distant media converter is off;

when receiving an initial wake-up signal from said local device, via said transmission medium, the transceiver of said distant media converter generates an electrical wake-up signal resulting from the conversion of said initial wake-up signal;

the transceiver of the distant media converter sends said electrical wake-up signal, or a wake-up information derived from said electrical wake-up signal, to the processing layer unit of said distant device, through a first transmission line which is independent of the physical layer unit and the link layer unit of said distant device;

when receiving said electrical wake-up signal or said wake-up information, the processing layer unit of said distant device turns on.

2. The method according to claim 1, wherein the physical layer unit of said distant media converter may be the same as the physical layer unit of the distant device if the distant device and the distant media converter are integrated in a same housing.

3. The method according to claim 1, the distant device and the distant media converter being integrated in two separated housings connected by a cable wherein the method comprises:
the processing layer unit of the distant device is initially in Low Power mode;
the transceiver of said distant media converter sends the electrical wake-up signal to an electrical consumption unit comprised in the distant media converter;
when receiving the electrical wake-up signal, the electrical consumption unit generates an electrical consumption variation of the distant media converter, said electrical consumption variation being representative of said wake-up information;
a detection unit, comprised in the distant device, generates a wake-up information signal when detecting said electrical consumption variation via said cable;
the detection unit sends said wake-up information signal to the processing layer unit of said distant device;
when receiving said wake-up information signal, the processing layer unit of said distant device turns on.

4. The method according to claim 1, the distant device and the distant media converter being integrated in two separated housings connected by a cable, wherein the method comprises:
the processing layer unit of said distant device is initially in Low Power mode;
the transceiver of said distant media converter sends the electrical wake-up signal to an electrical consumption unit comprised in the distant media converter;
when receiving the electrical wake-up signal, the electrical consumption unit generates an electrical consumption variation of the distant media converter, said electrical consumption variation being representative of said wake-up information;
the processing layer unit of said distant device obtains said wake-up information by detecting said electrical consumption variation via said cable;
when obtaining said wake-up information, the processing layer unit of said distant device turns on.

5. The method according to claim 1, the distant device and the distant media converter being integrated in two separated housings connected by a cable, wherein the method comprises:
the processing layer unit of said distant device is initially in Low Power mode;
the transceiver of said distant media converter sends the electrical wake-up signal to the processing layer unit of said distant device, through a direct link;
when receiving said electrical wake-up signal, the processing layer unit of said distant device turns on.

6. The method according to claim 1, the distant device and the distant media converter being integrated in two separated housings connected by a cable, wherein the method comprises:
the processing layer unit of said distant device is initially off;
the transceiver of said distant media converter sends the electrical wake-up signal to an electrical consumption unit comprised in the distant media converter;
when receiving the electrical wake-up signal, the electrical consumption unit generates an electrical consumption variation of the distant media converter, said electrical consumption variation being representative of said wake-up information;
when detecting said electrical consumption variation via said cable, a wake-up circuit, comprised in the distant device:
generates a powering signal and sends it to a power supply unit comprised in the distant device, and
generates a wake-up information signal and sends it to the processing layer unit of said distant device;
when receiving said powering signal, the power supply unit of said distant device powers the processing layer unit of said distant device;
when receiving said wake-up information signal, the processing layer unit of said distant device turns on.

7. The method according to claim 1, the distant device and the distant media converter being integrated in a same housing, wherein the method comprises:
the processing layer unit of said distant device is initially in Low Power mode;
the transceiver of said distant media converter sends the electrical wake-up signal to the processing layer unit of said distant device, through a direct link which is inside said housing;
when receiving said electrical wake-up signal, the processing layer unit of said distant device turns on.

8. The method according to claim 3, wherein the detecting of said electrical consumption variation via said cable comprises:
a media converter power supply unit, comprised in the distant device, provides a power supply to the distant media converter via said cable;
said electrical consumption variation is detected as a variation of a parameter of said power supply.

9. The method according to claim 3, wherein said electrical consumption unit is no more powered after the distant device has been woke up.

10. The method according to claim 1, wherein, initially, only a receiving part of the transceiver of said distant media converter is on, a transmitting part being off.

11. The method according to claim 1, wherein said electrical wake-up signal has a waveform belonging to a group of at least two possible waveforms, each possible waveform being associated with a different supplemental information.

12. The method according to claim 11, wherein each possible waveform is associated with a different wake-up mode.

13. The method according to claim 1, wherein, after the processing layer unit of said distant device turns on, the processing layer unit of said distant device turns on the physical layer unit and the link layer unit of said distant device.

14. The method according to claim 1, wherein the method comprises the following acts performed after the processing layer unit of said distant device turns on:
the processing layer unit of said distant device sends an acknowledgement request to the transceiver of said distant media converter, through a second transmission line which is independent of the physical layer unit and the link layer unit of said distant device;

when receiving said acknowledgement request, the transceiver of said distant media converter sends to the transceiver of said local media converter, via said transmission medium, an initial acknowledgement signal.

15. The method according to claim 14, further comprising:

when receiving said initial acknowledgement signal from said distant device, via said transmission medium, the transceiver of said local media converter generates an electrical acknowledgement signal resulting from the conversion of said initial acknowledgement signal;

the local media converter sends said electrical acknowledgement signal, or an acknowledgement information derived from said electrical acknowledgement signal, to the processing layer unit of said local device, through a third transmission line which is independent of the physical layer unit and the link layer unit of said local device, at least one of the physical layer unit and the link layer unit of said local device being off or in Low Power mode.

16. The method according to claim 1, further comprising:

initially, at least one of the physical layer unit and the link layer unit of said local device is off or in Low Power mode, the transceiver of said local media converter is on;

the processing layer unit of said local device sends a wake-up request to the transceiver of said local media converter, through a fourth transmission line which is independent of the physical layer unit and the link layer unit of said local device;

when receiving said wake-up request, the transceiver of said local media converter sends to the transceiver of said distant media converter, via said transmission medium, said initial wake-up signal.

17. The method of claim 1, further comprising waking up a plurality of devices connected in series, wherein the acts of receiving an initial wake-up signal, generating an electrical wake-up signal, and sending the electrical wake-up signal are implemented in a cascade process: for a pair of successive devices acting respectively as a local device and a remote device, after the remote device has been awakened, its processing layer unit being turned on, it acts as a local device and sends an initial wake-up signal to the next device, acting as a remote device.

18. An assembly comprising a distant device and a distant media converter, integrated in a same housing or in two separated housings connected by a cable, said distant device comprising a physical layer unit, a link layer unit and a processing layer unit, said distant media converter comprising a transceiver and a physical layer unit, wherein:

the transceiver comprises means for generating an electrical wake-up signal resulting from the conversion of an initial wake-up signal received from a local device via a transmission medium, the physical layer unit of said distant media converter being off;

the transceiver comprises means for sending said electrical wake-up signal, or a wake-up information derived from said electrical wake-up signal, to the processing layer unit, through a first transmission line which is independent of the physical layer unit and the link layer unit;

the processing layer unit comprises means, activated when receiving said electrical wake-up signal or said wake-up information, for turning on, at least one of the physical layer unit and the link layer unit being initially off, the processing layer unit being initially off or in Low Power mode.

19. An assembly comprising a local device and a local media converter, integrated in a same housing or in two separated housings connected by a cable, said local device comprising a physical layer unit, a link layer unit and a processing layer unit, said local media converter comprising a transceiver and a physical layer unit, wherein:

the processing layer unit comprises means for sending a wake-up request to the transceiver of said local media converter, through a transmission line which is independent of the physical layer unit and the link layer unit, at least one of the physical layer unit and the link layer unit being initially off or in Low Power mode;

the transceiver comprises means, activated when receiving said wake-up request, for sending to a transceiver of a distant media converter, via a transmission medium, an initial wake-up signal, the physical layer unit of said local media converter being off.

* * * * *